Feb. 16, 1937.  J. R. McDERMET  2,071,134
METHOD AND APPARATUS FOR HEATING AND DEAERATING LIQUIDS
Filed Nov. 12, 1934  3 Sheets-Sheet 3
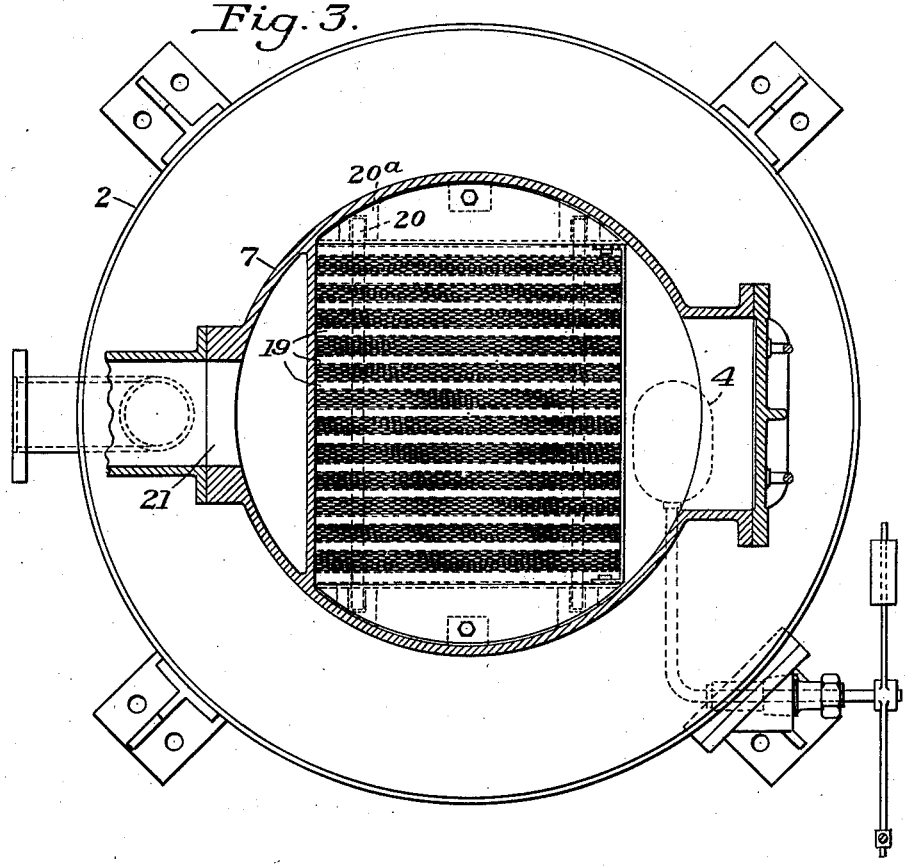
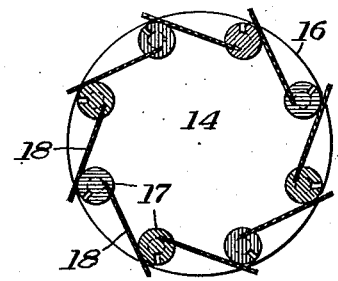
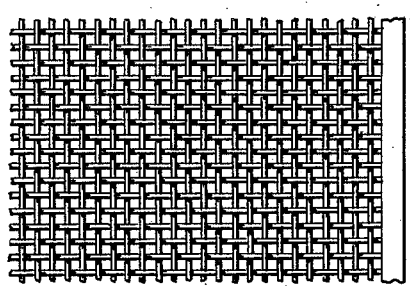
INVENTOR
John R. McDermet
by his atty's
Byrnes, Stebbins & Blenko Patented Feb. 16, 1937

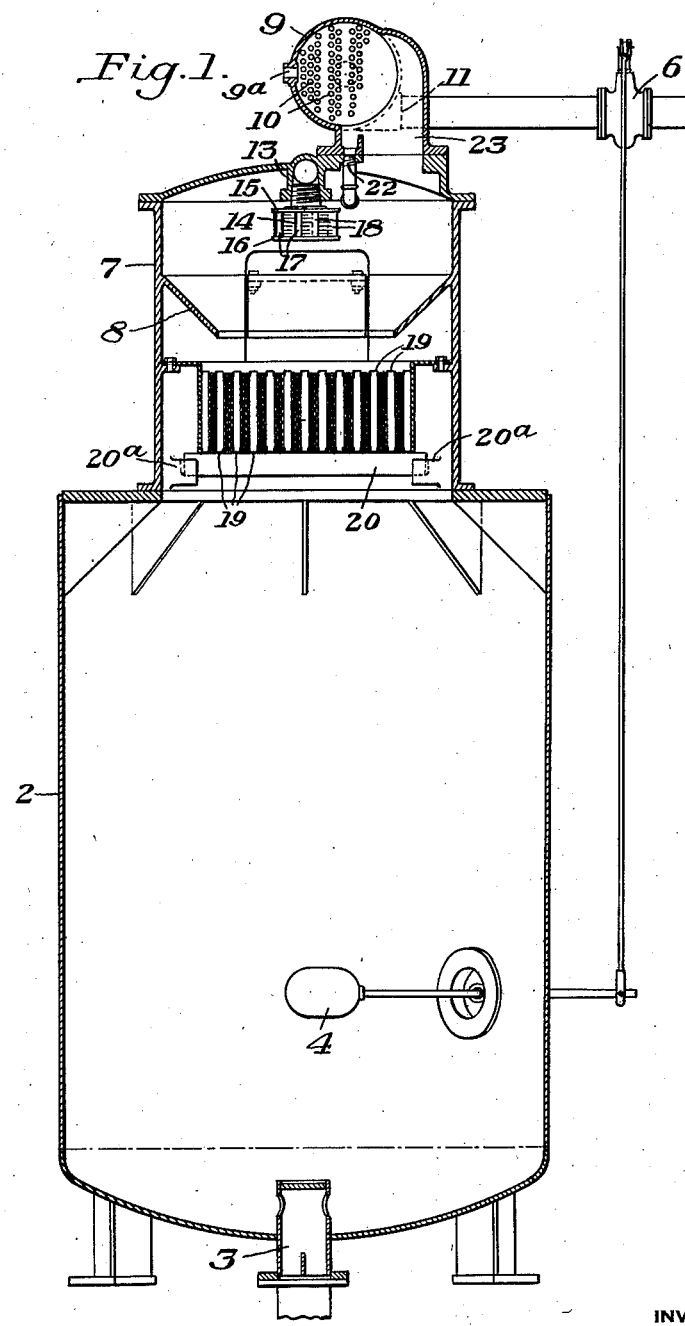

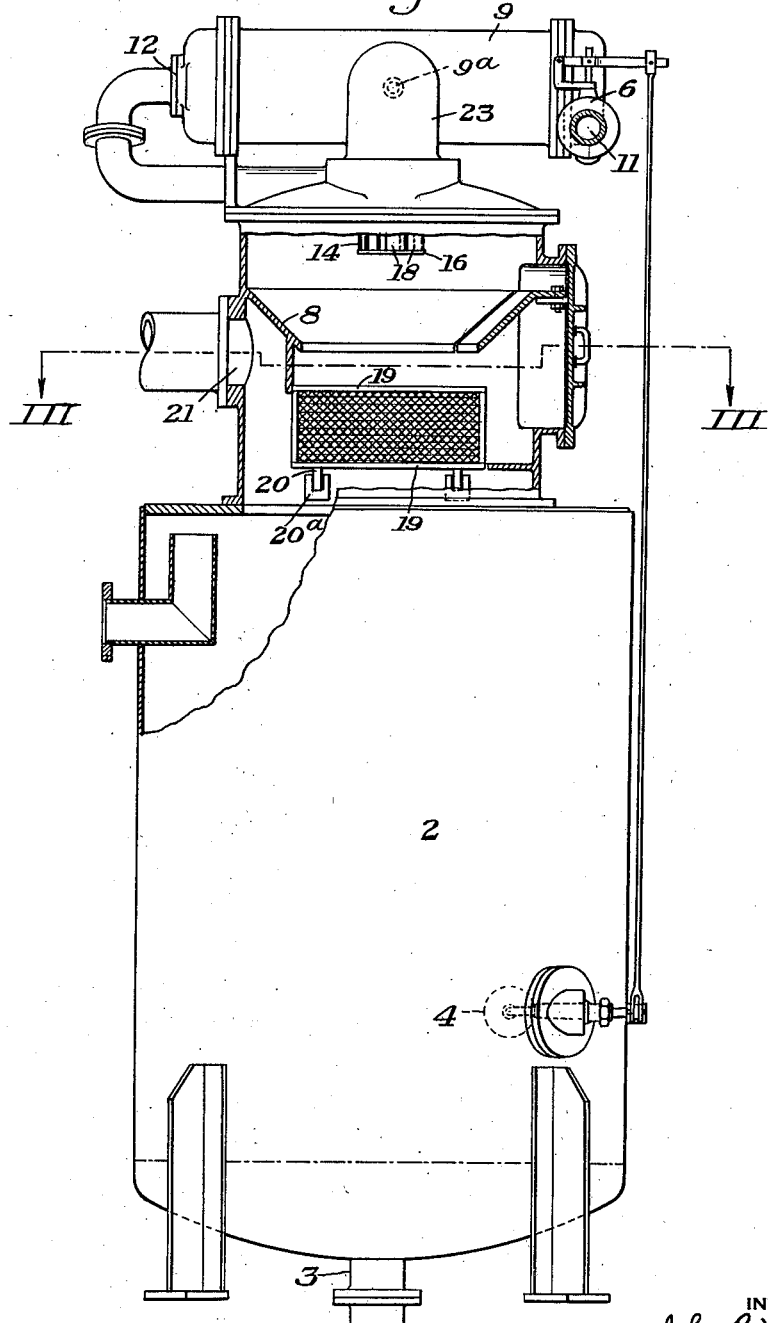

2,071,134

UNITED STATES PATENT OFFICE 2,071,134

METHOD AND APPARATUS FOR HEATING AND DEAERATING LIQUIDS

John R. McDermet, Jeannette, Pa., assignor to Elliott Company, Pittsburgh, Pa., a corporation of Pennsylvania Application November 12, 1934, Serial No. 752,796

12 Claims. (Cl. 183—2.5)

Figure 1 is a vertical section showing one form of apparatus for carrying out my invention;

Figure 2 is a side elevation of the same, partly in section, at right angles to Figure 1;

Figure 3 is a horizontal cross-section on the line III—III of Figure 2;

Figure 4 is a detailed view of the spray nozzle which I may employ; and

Figure 5 is a fragmentary detail view of one form of the cartridge material.

My invention relates to the multi-stage deaerating of liquids, such as water, wherein the water is first raised to temperature in a heating stage and then fed into a second or pressure stage where it is supplied with external heat, usually in the form of steam. In the second stage, the steam may be supplied from outside or may be formed by evaporating water, such as the water being deaerated.

In earlier patents in this art, tray systems were generally employed in one or more of such stages for bringing the water and steam atmosphere into substantial equilibrium. Such tray structures are well adapted for land purposes but when placed on a locomotive or a marine floating structure, such as a vessel, the rolling and pitching will throw water off the trays and seriously affect the operation.

The object of the present invention is to replace the tray structures or similar structures in at least one of the stages by a structure which will bring the water and steam into intimate contact without losing control of the subdivision or distribution of water under conditions where the inclination of the apparatus is changing, as, for example, on shipboard.

In the drawings in which I show one form of apparatus for carrying out my invention, 2 represents a storage tank having an outlet 3 to the point of use of the deaerated water, this storage tank having a float valve device 4 whose external portion is connected to the water inlet valve 6 of the system so that the supply of water to the deaerating heater is controlled by the demand on the deaerated water. In the form shown, the shell 7 of the deaerator is mounted on the top of the storage chamber and is partially separated into two stages by the intermediate inwardly and downwardly projecting frustum of the cone 8.

Above the deaerator is a vent condenser 9 shown as of the surface condenser type, the opposite heads of the cylindrical shell being connected by tubes 10 through which the entering water flows. The water enters at 11 and passes out the other end at 12, thence being led to the nozzle 13 of a spray head 14. This depending spray head may be of the type shown in my copending application Serial No. 671,856 filed May 19, 1933, for Spray devices, being shown in Figure 4. In essence it consists of top and bottom plates 15 and 16 having a circular row of shouldered connecting posts 17 as shown in Figure 4. Each of these posts has a longitudinal slot which engages a resilient sheet-like closure or gate member 18, which when not under pressure preferably is pressed against the next post as shown. When the pressure builds up in this chamber, it forces these resilient closures outwardly and the water is discharged in tangentially directed thin sheetlike streams into the steam rising through this heat stage.

In the pressure stage of the deaerator as shown, I provide a special means for intimately contacting the water and steam, which means is not materially affected by rolling or pitching of the vessel or apparatus carrying this system. In the form shown, this consists of what may be termed a cartridge carrier shown as having twelve socalled separated cartridges, each formed of a series of layers of mesh or foraminous material secured together by a series of, say 7 or 8 layers of wire mesh, expanded metal or similar material. These cartridges are supported by frames at their edges, the top and bottom transverse members of the frame being in the form of small channels 19 connecting the side members and forming a series of lanes between the cartridges. The side members are thin strips. The strips and channels are secured to the cartridges by soldering or welding, the whole cartridge assembly thus forming a unitary structure.

As seen from the above explanation, the water moves downwardly along the circuitous passageways of each cartridge in such a manner that a plurality of spaced zones of stratified water are provided. By reason of the baffles, the steam which is projected normally, or in other words, at right angles to the flow of the stratified water, cannot enter the strata except through the spacing between the zones. In this way, a very efficient deaerating procedure is accomplished, which is particularly effective where the boiler is subjected to tilting as in marine and locomotive installations. The cartridge carrier is preferably carried on beams 20 mounted on suitable lugs 20a within the lower part of the deaerator shell, and secured in central position.

The steam enters the lower stage of the deaerator shell through opening 21, passes down around the depending cone 8 and thence passes horizontally through the lanes between the cartridges, part rising through the mesh material and part passing on to rise around the cone. While the steam is thus passing horizontally, in the form shown, the heated water collected by the cone and passing downward is fed down through the foraminous cartridges, thus being brought into intimate contact with the steam which penetrates to some extent into the interstices of the foraminous cartridges. Thence it drops into the storage receptacle below and is drawn off as desired for the point of use.

The vent condenser is preferably provided with a vent 9a which may or may not be provided with an ejector, and a drip outlet may be provided therefor as shown at 22 discharging into shell 7. 23 is the inlet to the vent condenser for the rising steam, vapor and air mixture.

In the operation of the apparatus, steam enters at 21 and the water to be deaerated enters the vent condenser at 11. As the water passes through the vent condenser, it is heated somewhat by the vented atmosphere of the heating stage and may thence pass to an intermediate heater (not shown), or to the first stage. In either case in the form shown, it enters the spray nozzle at 13, is sprayed through the heating stage and is therein heated by the rising steam, this stage forming in effect a contact heater.

In accordance with the action of such heater, the steam is condensed to the necessary amount and the heat recovery vent condenser and heater constitute an automatic control for the amount of heat sucked in and used—in the form of steam in this case. The vent condenser acts to recover the heat and effect continuous withdrawal of air and gases. The supply of water and steam is automatic in accordance with the continuous but varying demands for air-free water. The amount of entering steam is regulated by the vent condenser usually in connection with the heater, while the amount of water fed in a continuous manner is controlled by the float valve in the storage space.

After the water and steam are mixed in the first or heating stage, the water is collected on the cone and fed down through the interstices of the cartridges in intimate contact with the steam drawn in in passing through the lanes. These lanes are guidance passages for the steam and the cartridge layers are of value for the purpose desired in that they are porous, have wide interstitial spacings, are readily permeable to the flow of liquids and steam, and keep them in intimate contact during their passage. It will thus be seen that the water is caused to separate into a plurality of laterally spaced groups of zones and these zones, by reason of the type of cartridges provided, break up or disperse the water and tend somewhat to retard the flow in order that an efficient deaerating action may be obtained when steam is introduced between the spacing and contacts the water moving through the zones.

This arrangement is such that the water may flow downwardly and the steam horizontally without one flow greatly affecting the other. The films of water will adhere to the wire mesh by capillary attraction and if the steam velocity is sufficient to move a film of water in the direction of steam flow, the film will only move a small distance before it clings to another mesh. Hence it is possible to pass steam through the cartridges with considerable velocity and at the same time bring them into intimate contact with the water. Change in the angle of inclination of the cartridges will not seriously affect the mixing of water and air, the lanes being convenient means for feeding steam into the interstitial spaces of the cartridge material.

In this second or pressure stage, the partial pressure of the air is so reduced that the oxygen is reduced to substantially zero and the deaerated water drops into the storage space.

The advantages of my invention result from the use of the porous, foraminous cartridges or portions of mesh material, which provide intimate mixture of the steam and water while not affecting the transverse flow of one relative to that of the other; this not being materially affected by pitching or rolling of the general carrier. By the use of the porous permeable structure, I maintain better control of the liquid than heretofore where the liquid and steam have been mixed by mere spraying or dripping. For this reason, I employ the term "contacting" as applied to the use of such a system as distinguished from spraying or dripping of the liquid in the steam atmosphere.

By using cartridges composed of a plurality of mesh layers in contact, I achieve a marked advantage over previous contact heat exchangers involving a single mesh layer or a multiplicity of spaced mesh layers. In the latter, water flowing from one wire of the mesh to the next is apt to fall off into space, particularly where the mesh is in motion, as would be the case of a steamship or locomotive installation. A single mesh layer or a plurality of spaced layers obviously could not serve to guide the flow of water unless maintained in the vertical position. The cartridges being composed of a plurality of mesh layers in contact, provide effective guiding for the water flow, regardless of the tilting of the structure as a whole.

The steam lanes between cartridges have an important function. Because of the velocity of the steam traversing the deaerator, considerable quantities of steam are required to scrub an appreciable portion of the water flowing therethrough. The steam lanes provide passages for the large volume of steam required. The steam does not, however, flow straight through the lanes between cartridges, but swirls and eddies therethrough so that there is continuous intimate contact between the steam and the inner portions of the mesh as well as the water droplets descending therethrough.

While I show a horizontal flow of steam through the second stage, the steam may flow upwardly. Also the same cartridge structure which I show in the pressure stage may be employed in the heating stage as a means for heating the water. In such case the heating stage may use the cartridge mixer or any other desirable means for mixing the steam and water.

The paths of steam and water may be changed so that the steam and water both pass downwardly through the stages. In this case, the venting would be carried out in the lower part of the deaerator, the steam inlet being at the top, admitting steam first to the spray-head and later to the cartridge with the removal of the residual mixture below the cartridge structure. This would involve a change in the location of the vent condenser, which would withdraw its mixture adjacent the cartridge structure rather than adjacent to the spray heating structure shown. The vent condenser may be connected to either stage within my invention.

Other changes may be made without departing from my invention, since I consider myself the first to use the porous permeable and preferably foraminous structure in at least one of the stages of multi-stage water treatment for removing air and gases.

I claim:

1. Contact heat exchange apparatus comprising a plurality of cartridges disposed in laterally spaced relation, each cartridge comprising a plurality of mesh layers in contact.

2. The apparatus defined by claim 1 characterized by means adjacent the upper edges of the cartridges for obstructing the flow of fluid therebetween.

3. Contact heat exchange apparatus comprising a plurality of cartridges disposed substantially vertically and in laterally spaced relation, each layer comprising a plurality of layers of mesh, and dividing means between the cartridges and extending above the upper edges thereof, whereby to stratify fluid falling on the cartridges from above.

4. Heat exchange apparatus particularly adapted for installations such as ships, locomotives and the like where the apparatus is subjected to rocking or pitching, comprising a mass of metallic mesh including a plurality of mesh layers in contact, and means for supplying steam and water thereto, whereby the water and steam delivered to said mass are intimately mixed and tilting of the apparatus is prevented from affecting such mixture, said mass comprising individual spaced cartridges each having a plurality of layers.

5. Heat exchange apparatus particularly adapted for installations such as ships, locomotives and the like where the apparatus is subjected to rocking or pitching, comprising a mass of metallic mesh including a plurality of mesh layers in contact, means for supplying steam and water thereto, whereby the water and steam delivered to said mass are intimately mixed and tilting of the apparatus is prevented from affecting such mixture, said mass comprising individual spaced cartridges each having a plurality of layers, and means for stratifying the water to direct it through said cartridges.

6. Apparatus for causing intimate mixture of water and steam comprising a plurality of flat cartridges disposed on edge and in spaced relation, each cartridge including a plurality of layers of metallic mesh, means connecting the upper edges of the cartridges and obstructing the flow of fluid therebetween, an enclosure for the assembled cartridges, and means for applying steam and water thereto.

7. Contact exchange apparatus including a plurality of cartridges disposed in a laterally spaced relation, each of said cartridges having a plurality of layers of permeable material, the number of said layers being proportioned to the amount of liquid to be retained under pitching and rolling conditions, elements directing a fluid through said cartridges, and elements directing another fluid through the spacing between said cartridges for deaerating the first mentioned fluid, said last mentioned elements preventing contact between the two fluids except adjacent such spacing.

8. In a contact exchange apparatus having a suitable chamber, a plurality of upwardly extending and horizontally projecting cartridges disposed in a laterally spaced relation within the chamber, means for causing a flow of water through said cartridges, and means for causing a flow of steam along the spacing between said cartridges for deaerating the water, said cartridges comprising a plurality of layers of circuitous liquid passageways.

9. In the method of deaerating water, the steps including separating the water into a plurality of spaced groups of dispersion and flow retarding zones, moving the water through the zones, and moving steam through the spacing between the zones in a direction substantially normal to the direction of movement of the water, and causing a deaerating contact between the water and the steam.

10. In a method of deaerating water, the steps including passing the water through a heating stage in contact with steam, separating the water into a plurality of spaced groups of dispersion and flow retarding zones, moving the water circuitously through the zones, and causing steam to flow along the spacing between the zones for deaerating the circuitously moving water, and causing a deaerating contact between the water and the steam.

11. Contact exchange apparatus including a plurality of cartridges disposed in a laterally spaced relation, means supplying water to the cartridges, each cartridge having a plurality of layers of circuitous passageways, means supplying steam to the apparatus, and elements preventing the steam from entering said cartridges except from the spacing between said cartridges.

12. In the method of deaerating water, the steps including separating the water into a plurality of spaced groups of dispersion and flow retarding zones, causing a flow of water into the zones, and causing a flow of steam into the spacing between the zones while preventing a direct flow of the steam into the zones and while permitting a deaerating contact with the water in the zones.

JOHN R. McDERMET.